F. R. BODNAR.
AUTOMOBILE SIGNAL.
APPLICATION FILED DEC. 27, 1920.

1,412,914.

Patented Apr. 18, 1922.

INVENTOR.
Frank R. Bodnar
BY
Chamberlain & Newman
ATTORNEYS.

UNITED STATES PATENT OFFICE.

FRANK ROBERT BODNAR, OF BRIDGEPORT, CONNECTICUT.

AUTOMOBILE SIGNAL.

1,412,914. Specification of Letters Patent. Patented Apr. 18, 1922.

Application filed December 27, 1920. Serial No. 433,302.

*To all whom it may concern:*

Be it known that FRANK R. BODNAR, a citizen of the United States, and resident of Bridgeport, in the county of Fairfield and State of Connecticut, has invented certain new and useful Improvements in Automobile Signals, of which the following is a specification.

This invention relates to new and useful improvements in signaling devices of duplex character, such as disclosed in Letters Patent No. 1,185,170, granted to me on May 30, 1916, and which are especially suitable for automobiles, motor vehicles and the like.

An object of the invention is to produce a novel and simply constructed signaling device having a duplicate set of signals, arranged in the forward and rearward portions, respectively, of the signaling device, adapted to be illuminated from time to time, and provided with means capable of simultaneously uncovering a signal or signals in each set, in order that the uncovered signals may be visible from both the front and rear of the device.

A further object is to provide a duplex signaling device equipped with substantially improved operating mechanism adapted to the purpose of uncovering the signals and with novelly constructed frame work capable of supporting said operating mechanism in ideal manner.

A still further and important object is to provide in the rearward set of signals of such a device a colored signal, and to provide in the forward set thereof a clear signal, and to so arrange said colored and clear signals in said sets of signals that they will both be uncovered, preferably when the operating mechanism of the signaling device is normally positioned, to provide a white light visible at the front of the signaling device and a colored, preferably red, light visible at the rear thereof.

With these and other objects in view the invention resides and consists in the construction and novel combination and arrangement of parts hereinafter more fully described, illustrated in the accompanying drawing, and pointed out in the claims hereto appended, it being understood that various changes in the form, proportion and size and minor details of construction within the scope of the claims may be resorted to without departure from the spirit or sacrificing any of the advantages of the invention.

Similar characters of reference denote like or corresponding parts throughout the several figures of the accompanying drawing forming a part of this specification, and upon which, Fig. 1 is a perspective view of the signaling device;

Figure 4:
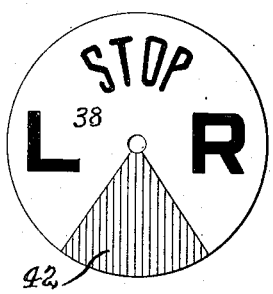
Figure 5:
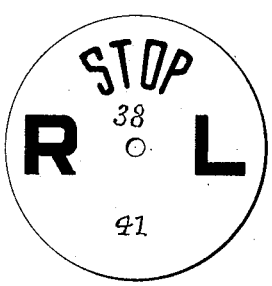

Figs. 4 and 5, respectively, disclose rearward and forward signal plates that may be used in connection with the signaling device.

The device of the invention is designed to be attached to the side of a vehicle in any desired manner, as by means of bracket A, in order that the signals may be read both from the front and rear of the vehicle, and it is preferably attached at some location in close proximity to the driver's seat in order that it may be readily manipulated and seen by the driver.

The casing of the signaling device is preferably of cylindrical form. In opposite ends of the casing are secured, in any desired manner, transparent glass plates 10—10 providing, together with the casing, a housing for the movable and fixed parts of the signaling device. 11—11 denote retaining rings arranged in circumferential grooves 12—12 to insure the positions of the glass plates.

Snugly fitted within the casing and preferably arranged midway between glass plates 10—10 is an annular member 13 provided with opposite inwardly extending circumferential flanges 14—14 adapted to carry a supporting frame or lamps 15—15 and the operating mechanism of the signaling device. This supporting frame is contained wholly within the casing and preferably consists of a metal strip bent to form two sides 16 and 17 diametrically arranged in the annular member and connected together by screw 18. The longer side member 16 of the frame has its two ends connected to the opposite portions of the casing while the other member is secured to the lower portion only. The lower ends are spread to accommodate the electric wire 19 and one of such ends is secured against one flange 14 of the annular member 13 by means of screws 20 and the other is similarly secured to the opposite flanges 14. The two side members of the frame are further generally disposed parallel and in spaced relation with each other and have their lower ends closely fitted between the before mentioned flanges.

The two parallel frame members are further curved as denoted to provide a clamp 21 for supporting the lamp sockets in a manner later to be explained. The shorter parallel frame member 17 terminates just beyond the clamp 21 while the other one continues and is secured above to the annular member, said last mentioned end portion 22 being preferably bent at right-angles, as shown to allow its outer extremity to rest against the annular member and its outer end to engage one of the flanges 14 thereof.

Figure 2:
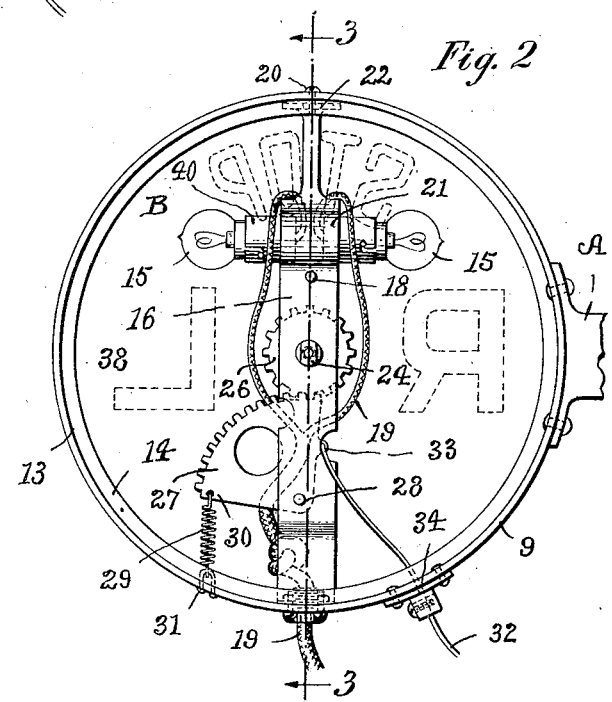
Fig. 2 is a rear elevation thereof, on an enlarged scale, with the inclosing glass, disk and signal plate upon the rearward or visible side of the signaling device removed.

The parallel frame members 16 and 17 are adapted to serve as guide members for the central shaft 23, and are provided with bearings 24—24 preferably arranged centrally in the casing. Fixed upon shaft 23 and arranged between parallel portions 25—25 is a pinion 26 adapted to be engaged by a segment 27 pivoted at 28 between said parallel portions, a coil spring 29 attached to the segment as at 30 and to the annular member and casing as at 31 serves to hold the segment in normal position of rest as shown in Fig. 2. A wire 32 or other operating member, attached to the segment as at 33 and extending freely through the casing as at 34, is for the purpose of moving the segment against the action of spring 29 to cause it to rotate the pinion and its shaft. This wire operating member may be operated from the dash in any desired manner and any suitable means may be employed to hold the wire at any desired position of the segment and against the action of the spring.

The central shaft 24 is a trifle shorter than the distance between glass plates 10—10 and has secured upon its opposite ends to turn with it, disks 35—35 which are preferably duplicates of each other, each disk being provided with an opening 36 into which a pointer 37 extends. 38—38 denote signal plates of any suitable transparent material having thereon any desired signals, such as R, Stop, L. These plates may be duplicates of each other, and are arranged upon opposite sides of the supporting frame, preferably closely adjacent, but not touching, disks 35. The signal plates are provided with openings to freely receive the central shaft and they have their circumferences secured in fixed relation with respect to the cylindrical casing. As shown, the outer edges of the signal plates rest against the outer faces of flanges 14—14, clamp rings 39 insuring their positions.

The two lamps 15—15 are arranged in the space B between the signal plates and are for the purpose of illuminating said space, being connected with the wire 19 before mentioned. I preferably use two lamps and socket them in the opposite ends of a short tube 40 supported in the clamp of the supporting frame.

Figure 1:
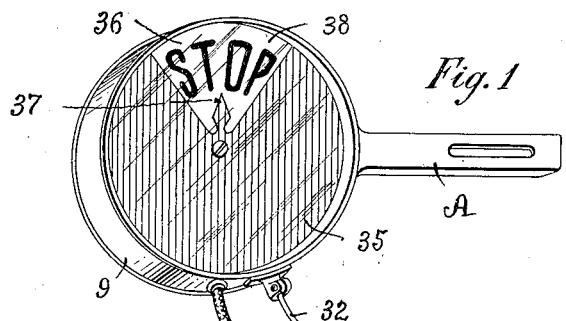
Figure 3:
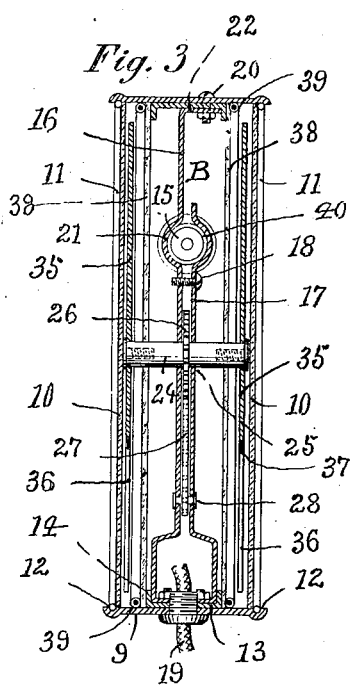
Fig. 3 is a sectional view as on line 3—3 of Fig. 2.

When it is desired to make visible any particular signal, the segment is caused to be moved upon its pivot and against the action of the coil spring to turn the pinion and its shaft to position the opening in the disk in front of that signal, as will be understood from Fig. 1. As hereinbefore mentioned, the openings in the disks are arranged to simultaneously uncover the same signal or signals of both the forward and rearward signal plates, so that a similar signal is visible at the same time from both the front and rear of the vehicle.

In Figs. 4 and 5 I have disclosed signal plates that may, respectively, be the rearward and forward signal plates of a signal device of the present character. One of these plates, that of Fig. 5, adapted to constitute the forward plate, has thereon the signals R, Stop and L and has a clear signal 41 below said signal "Stop". The other signal plate, that of Fig. 4, is similar, except that this last mentioned plate has a colored signal 42 below said signal "Stop". It is apparent that the clear signal of the forward plate and the colored, preferably red, signal of the rearward plate will be simultaneously uncovered by rotation of disks 35. They are preferably so uncovered when the operating mechanism is at normal position, as in Fig. 2. A parking light, eliminating the necessity for a special tail light, may be thus provided.

Having thus described the invention, what I claim and desire to secure by Letters Patent is:—

1. A signaling device comprising a casing, a supporting frame therein, a shaft mounted in said supporting frame, disks fixed upon said shaft, each of said disks having an opening, signal plates fixed in said casing and arranged between said disks and supporting frame, each of said signal plates having signals and an opening permitting free passage of said shaft, lamps for illuminating the space between said signal plates and means for rotating said disks whereby each signal plate may be visible, said means including a pinion upon said shaft and a segment pivoted to said supporting frame and adapted to mesh with said pinion.

2. A signaling device comprising a casing, an annular member therein and having spaced apart inwardly extending flanges, a supporting frame extending diametrically across aid annular member and arranged between said flanges, a shaft mounted in said supporting frame, disks fixed upon said shaft, each of said disks having an opening, signal plates arranged between said disks and supporting frame and fixed in said casing, each of said signal plates having signals and an opening allowing free passage of said shaft, means for illuminating said signal plates, and means for simultaneously rotating said disks, said last mentioned means comprising a pinion fixed upon said shaft, a segment pivoted upon said supporting frame to engage said pinion, and an operating member for actuating said segment.

3. A signaling device comprising a casing, an annular member therein and having spaced apart inwardly extending flanges, a supporting frame extending diametrically across said annular member and fixed between said flanges, said supporting frame comprising a single strip of material providing parallel portions and a clamp, a shaft mounted in said parallel portions, disks fixed upon said shaft, each of said disks having an opening, signal plates arranged between said disks and parallel portions and fixed in said casing, each of said signal plates having signals and an opening allowing free passage of said shaft, lamps carried by said clamp and arranged between said signal plates, and means for simultaneously rotating said disks, said means comprising a pinion fixed upon said shaft and arranged between said parallel portions, a segment pivoted between said parallel portions to engage said pinion, and an operating member for actuating said segment.

4. A signaling device including a casing provided in its forward portion with a signal plate having a clear signal and in its rearward portion with a signal plate having a colored signal, disks rotatably mounted upon the outer sides of both of said signal plates and having openings adapted to simultaneously register with said clear and colored signals to allow a clear signal to be visible at the front of a vehicle and a colored signal to be visible at the rear thereof.

5. A signaling device including a casing provided in its forward portion with a signal plate having a clear signal, and in its rearward portion with a signal plate having a colored signal, said clear and colored signals arranged directly opposite each other, disks rotatably mounted upon the outer sides of both of said signal plates and having openings directly opposite each other to simultaneously register with said clear and colored signals to allow a clear signal to be visible at the front of a vehicle and a colored signal to be visible at the rear thereof.

Signed at Bridgeport in the county of Fairfield and State of Connecticut this 23 day of December, A. D., 1920.

FRANK ROBERT BODNAR.

Witnesses:
   C. M. NEWMAN,
   F. H. MUSSLER.